United States Patent
Leprieur et al.

(10) Patent No.: US 7,937,994 B2
(45) Date of Patent: May 10, 2011

(54) METHOD AND DEVICE FOR DETECTING THE PRESENCE OF AN EXHAUST GAS TREATMENT SYSTEM IN AN EXHAUST LINE OF AN INTERNAL COMBUSTION ENGINE

(75) Inventors: Laurent Leprieur, Limours (FR); Vincent Rouault, Montigny le Bretonneux (FR); Cyril Pradeilles, Sucy en Brie (FR)

(73) Assignee: Renault S.A.S., Boulogne Billancourt (FR)

( * ) Notice: Subject to any disclaimer, the term of this patent is extended or adjusted under 35 U.S.C. 154(b) by 544 days.

(21) Appl. No.: 11/915,936

(22) PCT Filed: May 15, 2006

(86) PCT No.: PCT/FR2006/050440
§ 371 (c)(1),
(2), (4) Date: Jul. 10, 2008

(87) PCT Pub. No.: WO2007/003816
PCT Pub. Date: Jan. 11, 2007

(65) Prior Publication Data
US 2009/0210129 A1    Aug. 20, 2009

(30) Foreign Application Priority Data
May 31, 2005    (FR) ...................................... 05 05515

(51) Int. Cl.
*G01M 15/10*    (2006.01)

(52) U.S. Cl. .................................. 73/114.69; 73/114.75
(58) Field of Classification Search ............... 73/114.69, 73/114.71, 114.75
See application file for complete search history.

(56) References Cited

U.S. PATENT DOCUMENTS

| | | | | |
|---|---|---|---|---|
| 5,560,200 A | * | 10/1996 | Maus et al. | 60/274 |
| 7,228,223 B2 | * | 6/2007 | Braun | 701/114 |
| 7,752,901 B1 | * | 7/2010 | Holmen | 73/114.69 |
| 2004/0112044 A1 | | 6/2004 | Plote et al. | |
| 2006/0089783 A1 | * | 4/2006 | Braun | 701/114 |
| 2008/0156075 A1 | * | 7/2008 | Cunningham | 73/25.03 |
| 2010/0162691 A1 | * | 7/2010 | Holmen | 60/299 |

FOREIGN PATENT DOCUMENTS

| | | |
|---|---|---|
| DE | 102 28 659 | 1/2004 |
| EP | 0 236 659 | 9/1987 |
| EP | 0 890 716 | 1/1999 |
| EP | 1 052 385 | 11/2000 |

* cited by examiner

*Primary Examiner* — Eric S McCall
(74) *Attorney, Agent, or Firm* — Oblon, Spivak, McClelland, Maier & Neustadt, L.L.P.

(57) ABSTRACT

A method and device for detecting presence of an exhaust gas treatment system in an exhaust line of an internal combustion engine. The method determines the derivative of the temperature upstream of the treatment system, determines the derivative of the temperature downstream of the treatment system, and compares the downstream temperature derivative with a threshold value for detecting absence of the treatment system using a pre-determined upstream temperature derivative level.

10 Claims, 3 Drawing Sheets

METHOD AND DEVICE FOR DETECTING THE PRESENCE OF AN EXHAUST GAS TREATMENT SYSTEM IN AN EXHAUST LINE OF AN INTERNAL COMBUSTION ENGINE

BACKGROUND

The present invention relates to the field of the treatment of the exhaust gases of a motor vehicle internal combustion engine, and more particularly, a method and a device for detecting the presence of an exhaust gas treatment system in an exhaust line of a motor vehicle.

The invention applies to all types of treatment systems: particulate filter type, nitrogen oxide trap, catalytic or oxidizing converter, etc.

Some current regulations require that on-board diagnostic systems, which check that exhaust gas treatment devices are operating correctly, be responsible moreover for detecting the presence of such a system.

Various types of technique are currently used to detect the presence or the absence of an exhaust gas treatment system in an exhaust line.

Thus, detecting the presence of a particulate filter in an exhaust line of an internal combustion engine using a determination of the differential pressure at the boundaries of the filter is known, the absence of the particulate filter being shown by a change in behavior of the differential pressure.

However, this technique requires working at high volume flow rates. Moreover, the signals supplied are not very reliable, because the differential pressure is usually worked out from very noisy measurements.

Detecting the presence of a nitrogen oxide trap is also known using signals supplied by an exhaust gas mixture sensor placed downstream of the filter, such as a binary mixture sensor, or a proportional mixture sensor, the mixture composition detected making it possible to determine the absence or the presence of the nitrogen oxide trap in the exhaust line.

This technique also has a certain number of disadvantages relating in particular to the fact that the signals supplied by the sensor are not very reliable, because the aging of the sensor causes a shift in the measurements provided, and relating to the cost of the sensor. Moreover, the mixture composition measured by the sensor must be processed in relation to the mixture composition of the exhaust gases upstream of the nitrogen oxide trap. Now, with regard to diesel engines, it is difficult to check the mixture composition of the exhaust gases upstream of the nitrogen oxide trap, so that this technique is relatively difficult to employ reliably.

BRIEF SUMMARY

In view of the above, the object of the invention is to overcome the disadvantages of the prior art and enable the detection of the presence of an exhaust gas treatment system in an exhaust line of a motor vehicle internal combustion engine, reliably, simply and inexpensively.

The subject of the invention is therefore, according to a first aspect, a method for detecting the presence of an exhaust gas treatment system in an exhaust line of a motor vehicle internal combustion engine, comprising the following stages:
  determination of the derivative of the temperature upstream of the treatment system;
  determination of the derivative of the temperature downstream of the treatment system; and
  comparison of the derivative of the temperature downstream of the treatment system with a threshold value for detecting the absence of the treatment system, using a preset level of the derivative of the temperature upstream of the treatment system.

According to one embodiment, a counter is incremented each time the threshold value is exceeded and it is concluded that the treatment system is absent when the count level of the counter exceeds a second preset threshold value.

Advantageously, the derivative of the temperature downstream of the system is also compared with the threshold value when the derivative of the temperature upstream of the system exceeds a third threshold value.

According to another feature of the invention, the upstream and downstream temperature variations are divided into classes of preset values of temperature variations and a detection of the absence of the treatment system is carried out on a set of preset temperature variation value classes.

In that case, advantageously, each class of values being associated with a probability of occurrence of a corresponding temperature variation, said detection is carried out for classes of values higher than a class of values above which the probability of obtaining a corresponding temperature variation for an exhaust line provided with a designated treatment system is zero, and lower than a class of values above which the probability of obtaining an increase in temperature variations is zero.

It is then concluded that the treatment system is absent when the probability of obtaining a temperature variation downstream of the treatment system higher than a preset threshold value is lower than a probability of obtaining said variation for an exhaust line not provided with a treatment system, and higher than a minimum probability.

According to another aspect, the subject of the invention is a device for detecting the presence of an exhaust gas treatment system in an exhaust line of an internal combustion engine, comprising determination means for calculating the derivative of the temperature upstream and downstream of the system and a central processing unit comprising comparison means for comparing the calculated value of the derivative of the temperature downstream of the treatment system with a threshold value for detecting the absence of the treatment system.

According to another feature of this treatment system, it includes moreover a counter controlled by the output of the comparison means and which is incremented each time the threshold value is exceeded, and second comparison means for comparing the count level with a second threshold value above which it is concluded that the treatment system is absent.

According to a particular embodiment, the detection device includes moreover third comparison means for comparing the calculated value of the derivative of the temperature upstream of the treatment system with a third threshold value, the derivative of the temperature downstream of the treatment system being compared with the first threshold value when the derivative of the temperature upstream of the treatment system exceeds the third threshold value.

BRIEF DESCRIPTION OF THE DRAWINGS

Other aims, features and advantages of the invention, given only as non-limiting examples, will emerge on reading the following description written with reference to the attached drawings, in which.

DETAILED DESCRIPTION

Figure 1:
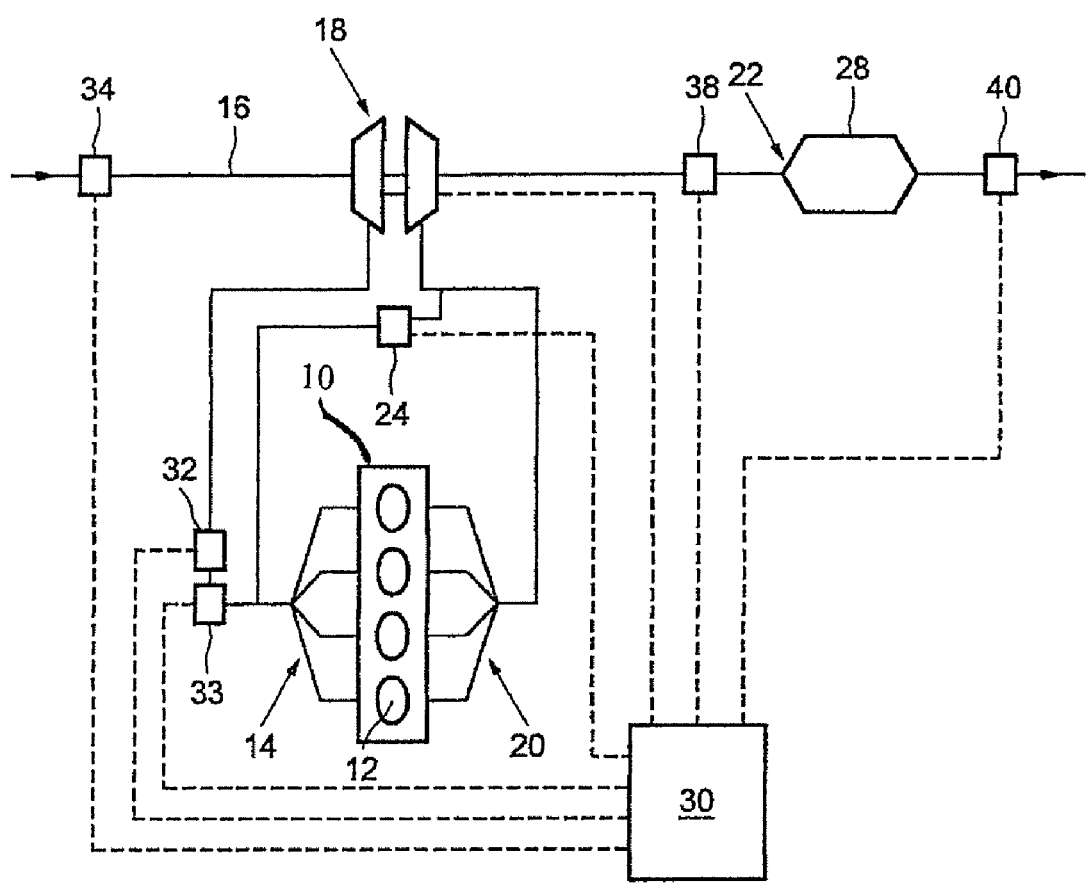
FIG. 1 is a schematic drawing of an internal combustion engine fitted with an exhaust line provided with a device for detecting the presence of an exhaust gas treatment system according to the invention.

FIG. 1 illustrates schematically the general layout of an internal combustion engine of a motor vehicle, designated by the general reference number 10.

In the embodiment being considered, the engine 10 is provided with four cylinders 12 in line.

The cylinders 12 are fed with air via an intake manifold 14, itself fed by a pipe 16 provided with an air filter (not illustrated) and a turbocharger 18 for boosting the air feed to the engine.

An exhaust manifold 20 collects the exhaust gases generated by the combustion and discharges them toward the outside, through the compressor 18 and an exhaust line 22.

An exhaust gas recirculation circuit collects a portion of the exhaust gases from the intake manifold 18, so as to limit the quantity of nitrogen oxides produced by the combustion while avoiding the formation of smoke in the exhaust gases.

As seen in FIG. 1, the recirculation circuit essentially includes a valve to regulate the flow of recirculated exhaust gases, designated by the reference number 24.

With regard to the exhaust line 22, this essentially includes an exhaust gas treatment system 28 composed of, for example, a particulate filter, a nitrogen oxide trap, or any conventional type of catalytic converter or oxidizing converter.

Finally, the engine 10 is associated with a central processing unit 30 which checks the operation of the engine 10, in particular the adjustment of its operating parameters, as well as checking the operation of the treatment system 28, and analyzing its operating condition.

Moreover, the central processing unit 30 is duly programmed to detect the presence of the treatment system 28 in order, for example, to emit an alarm signal if the treatment system is removed.

To carry out the check on the operation of the engine 10, it is provided with a turbocharging pressure sensor 32 and an air intake temperature sensor 33 in the intake manifold 14, as well as a flow sensor 34 fitted to the feed pipe 16. These sensors, as well as the main functional components of the engine and its air feed circuit, are connected to the central processing unit 30.

With regard to the detection of the presence of a treatment system 28, the exhaust line 22 is provided, on either side of the treatment system 28, with a first temperature sensor 38 designed to measure the temperature upstream of the treatment system 28, and a second temperature sensor 40 designed to measure the temperature downstream of the treatment system 28.

As will be described in detail hereinafter, the temperature values upstream and downstream of the treatment system 28 are processed by the central processing unit 30, so as, in particular, to calculate the derivative of the temperatures upstream and downstream of the treatment system 28 and compare the derivative of the temperature downstream of the treatment system with a threshold value for detecting the absence of the treatment system. This comparison is only made for set values of temperature variations upstream of the treatment system.

Figure 2:
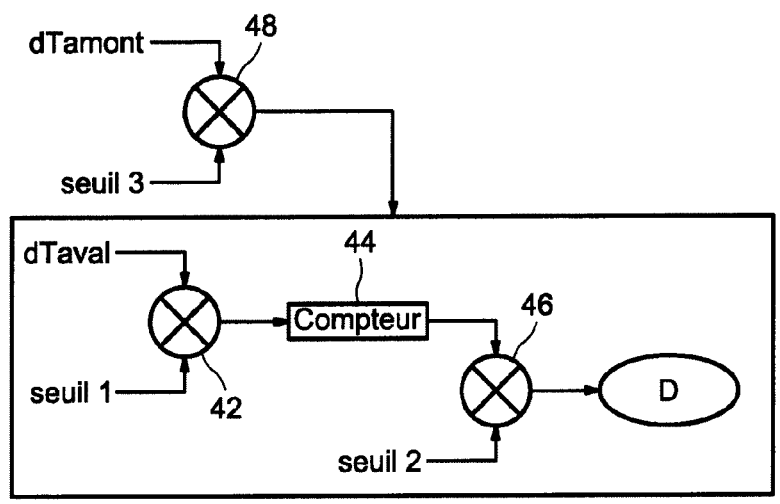
FIG. 2 is a schematic drawing illustrating the general layout of a device for detecting the presence of an exhaust gas treatment system.

Thus, as illustrated in FIG. 2, the central processing unit 30 includes a first comparator 42 which provides a comparison between the derivative of the temperature dTdownstream downstream of the treatment system 28 and a first threshold 1 value. A comparator 44, controlled by the output of the comparator 42, is incremented when the derivative of the downstream temperature T exceeds the threshold 1 value. A second comparator 46 makes a comparison between the count level of the counter 44 and a second threshold 2 value to take a decision D when the count level exceeds the threshold 2 value.

Thus, when the derivative of the temperature downstream of the treatment system 28 exceeds the threshold 1 value, it is considered that the exhaust line 22 is not provided with a system 28. However, it is actually concluded that the exhaust line is not provided with its treatment system only when it is observed that the threshold 1 value is exceeded a preset number of times fixed by the threshold 2 value.

Moreover, in addition to the counter 44 and the comparators 42 and 46, the central processing unit 30 is provided with a third comparator 48 which makes a comparison between the derivative of the temperature dTupstream, and a third threshold 3 value, in order to authorize the detection of the presence of the treatment system 28 only when the derivative of the temperature dTupstream upstream of the treatment system 28 exceeds the threshold 3 value. Thus, such an analysis is only carried out for variations with time of the temperature upstream of the treatment system 28, which are large enough to be able to observe differences in behavior between an exhaust line equipped with a treatment system and an exhaust line not provided with a treatment system.

Now will be described, with reference to FIGS. 3 to 5, the principle for detecting the presence of the treatment system according to the invention.

Figure 3:
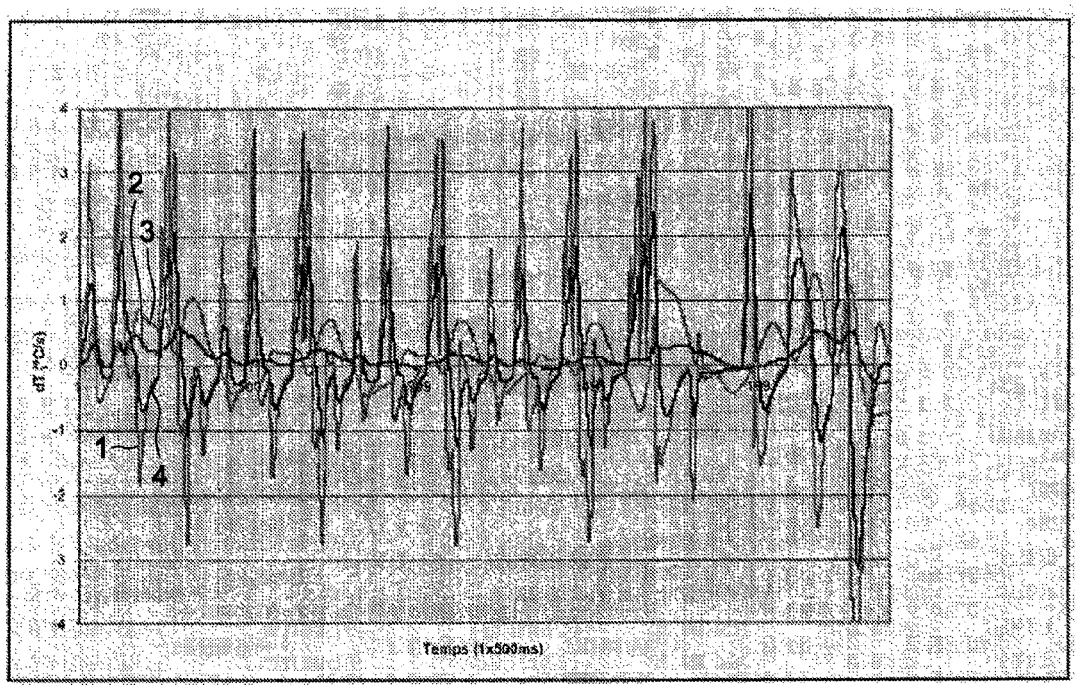
FIG. 3 shows curves illustrating the derivative of thermal signals upstream and downstream of an exhaust gas treatment system.

Reference will first be made to FIG. 3, which illustrates the derivative of temperature measurements supplied by the sensors 38 and 40, upstream of the system 28 (curve 1), downstream of the system 28, for a system of which the filtering material is composed of "cordierite" (curve 2), downstream of a treatment system 28 of which the filtering material is composed of silicon carbide (curve 3), and the derivative of the temperature measurement supplied by one of the temperature sensors 38 or 40, in the absence of a treatment system 28 (curve 4).

For example, these signals are obtained during a cold New European Driving Cycle (NEDC).

As seen in this FIG. 3, for a given input signal composed of the derivative of the temperature upstream of the system 28, the output signal, namely the dTdownstream signal, is attenuated and out of phase. It is noted that the attenuation and the phase difference depend on the thermal inertia of the emission control component used. Thus, the greater its inertia, the greater the attenuation and the phase difference. Such is the case in particular of a treatment system based on silicon carbide SiC, which produces a large attenuation and a large phase difference. On the contrary, in the absence of a treatment system 28, the phase difference and the attenuation are relatively small.

Figure 4:
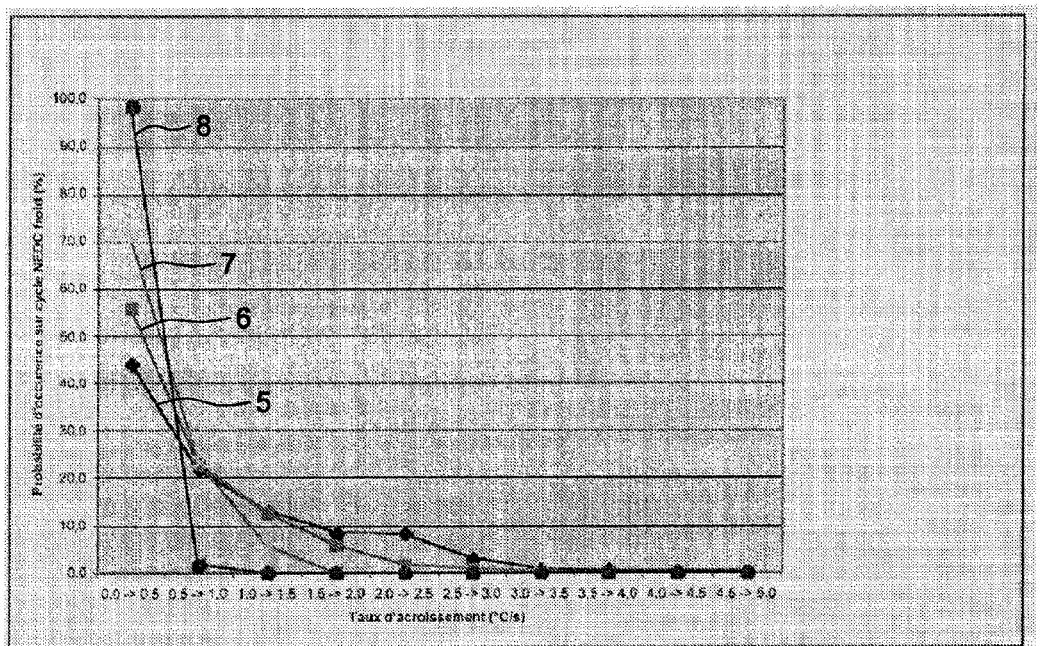
FIG. 4 shows curves illustrating the variation of probability of obtaining rates of temperature increase for various exhaust line configurations.
Figure 5:
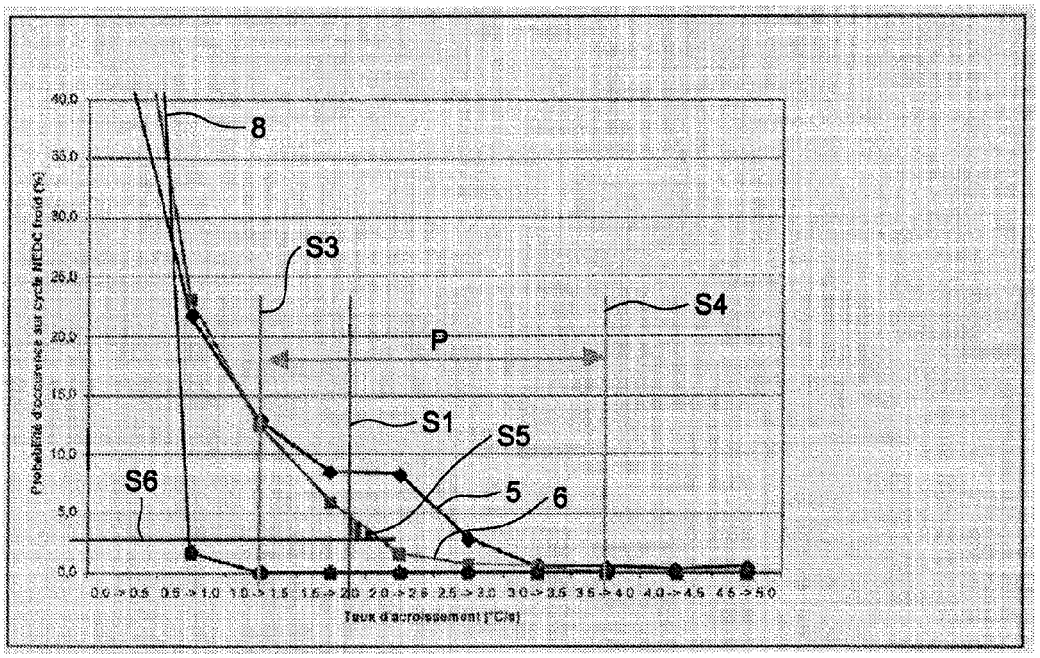
FIG. 5 shows curves illustrating the variation of probability of obtaining rates of temperature increase upstream and downstream of an exhaust gas treatment system, illustrating the principle on which the invention is based.

With reference to FIG. 4, the temperature variations upstream and downstream of the system 28 are divided into classes of preset values of temperature variations. It will be noted however that the size of these classes is configurable. Such sampling makes it possible to determine the number of values of derivatives of temperature upstream and downstream of the system 28, for various types of treatment systems, and also in the absence of treatment systems, for each of these classes, during a given configurable observation period which corresponds, in the embodiment considered, to a cold NEDC.

It can be seen in this FIG. 4, that the probability of occurrence, during a cycle, of a variation of the derivative of the upstream temperature of between 1° C./s and 1.5°/s is 0.13 (curve 5). For this type of driving, the probability of obtaining a dTdownstream response of between 1° C./s and 1.5° C./s is 0.13 in the absence of a treatment system (curve 6), 0.06 for a component with low thermal inertia (curve 7) and 0 for a component with high thermal inertia, in this case a silicon carbide-based system (curve 8).

It is therefore observed that, depending on the emission control component used, the probabilities of obtaining the dTdownstream signal by classes of value are different, and that for the same type of driving.

A threshold value of the dTdownstream derivative also occurs above which the probability of obtaining a higher value of the dTdownstream derivative is zero. This threshold value depends on the thermal inertia of the emission control component used.

In particular, for a silicon carbide-based treatment system 28, the threshold value is 1° C./s, while the threshold value is 1.5° C./s for a cordierite-based treatment system.

It is also noted that for the class of temperature variation values between 0.5° C./s and 1° C./s, it is impossible to distinguish an exhaust line provided with a high thermal inertia treatment system from an exhaust line not provided with a treatment system. Thus, as seen in FIG. 5, the detection of the presence of the treatment system 28 is only carried out for upstream temperature derivatives dTupstream higher than the threshold value S3. In the example considered, this threshold value is fixed at 1° C./s.

This detection range P is limited, at its upper value, by a threshold S4 which corresponds to the classes of temperature variations above which the probability of obtaining an increase in temperature variation is zero.

As shown previously with reference to FIG. 2, to carry out the detection of the presence of the treatment system 28, the derivative of the temperature dTdownstream worked out from the signals supplied by the sensor 40 is compared with the calibrated threshold value S1, then the number of times this value is exceeded is counted and listed with a view to taking a decision D.

In other words, it is considered that the treatment system 28 is absent when the temperature derivatives worked out from the signals supplied by the downstream sensor 40 are located in an area S5 defined by the threshold S1, the curve 6 corresponding to the variation of downstream temperature derivatives, in the absence of a treatment system 28, and a minimum threshold S6, so as to eliminate the values which correspond to a probability which is too small.

The invention claimed is:

1. A method of detecting if an exhaust gas treatment system is present or absent in an exhaust line of a motor vehicle internal combustion engine, comprising:
   measuring a temperature upstream of the treatment system;
   determining a derivative of the temperature upstream of the treatment system;
   measuring a temperature downstream of the treatment system;
   determining a derivative of the temperature downstream of the treatment system;
   comparing the derivative of the temperature downstream of the treatment system with a threshold value for detecting absence of the treatment system, using a preset level of the derivative of the temperature upstream of the treatment system;
   incrementing a counter each time the threshold value is exceeded; and
   determining that the treatment system is absent when the count level of the counter exceeds a second preset threshold value.

2. The method as claimed in claim 1, wherein the derivative of the temperature downstream of the treatment system is compared with the threshold value when the derivative of the temperature upstream of the treatment system exceeds a third threshold value.

3. A method of detecting if an exhaust gas treatment system is present or absent in an exhaust line of a motor vehicle internal combustion engine, comprising:
   measuring a temperature upstream of the treatment system;
   determining a derivative of the temperature upstream of the treatment system;
   measuring a temperature downstream of the treatment system;
   determining a derivative of the temperature downstream of the treatment system;
   comparing the derivative of the temperature downstream of the treatment system with a threshold value for detecting absence of the treatment system, using a preset level of the derivative of the temperature upstream of the treatment system;
   dividing the derivative of the temperature upstream and the derivative of the temperature downstream into classes of preset values of temperature variations; and
   determining that the treatment system is absent for a set of preset temperature variation value classes.

4. The method as claimed in claim 3, wherein each class of values is associated with a probability of occurrence of a corresponding temperature variation, the determining is carried out for classes of values higher than a class of values below which a probability of obtaining a corresponding temperature variation for an exhaust line provided with a designated treatment system is zero, and lower than a class of values above which the probability of obtaining an increase in temperature variations is zero.

5. The method as claimed in claim 4, wherein, when a probability of obtaining a temperature variation downstream of the treatment system higher than a preset threshold value is lower than a probability of obtaining the variation for an exhaust line not provided with a treatment system, and higher than a minimum probability, the determining determines that the treatment system is absent.

6. A device for detecting if an exhaust gas treatment system is present or absent in an exhaust line of an internal combustion engine, comprising:
   a first sensor to measure a temperature upstream of the system;
   a second sensor to measure a temperature downstream of the system;
   a central processing unit including determination means for calculating derivatives of the temperature upstream of the system and the temperature downstream of the system, and first comparison means for comparing a calculated value of the derivative of the temperature downstream of the treatment system with a threshold value for detecting absence of the treatment system;

a counter controlled by an output of the comparison means and that is incremented each time the threshold value is exceeded; and second comparison means for comparing a count level in the counter with a second threshold value above which the central processing unit determines that the treatment system is absent.

7. The treatment system as claimed in claim 6, wherein the first comparison means is a comparator.

8. The treatment system as claimed in claim 6, wherein the second comparison means is a comparator.

9. The treatment system as claimed in claim 6, further comprising third comparison means for comparing the calculated value of the derivative of the temperature upstream of the treatment system with a third threshold value, the derivative of the temperature downstream of the treatment system being compared with the first threshold value when the derivative of the temperature upstream of the treatment system exceeds the third threshold value.

10. The treatment system as claimed in claim 9, wherein the third comparison means is a comparator.

* * * * *